US009972106B2

(12) United States Patent
Cvetkovic et al.

(10) Patent No.: US 9,972,106 B2
(45) Date of Patent: May 15, 2018

(54) SYSTEMS, METHODS AND DEVICES FOR TAMPER PROOFING DOCUMENTS AND EMBEDDING DATA IN A BIOMETRIC IDENTIFIER

(71) Applicant: TigerIT Americas, LLC, Seattle, WA (US)

(72) Inventors: Slobodan Cvetkovic, Lake Worth, FL (US); Andrey Nikiforov, Key Colony Beach, FL (US)

(73) Assignee: TIGERIT AMERICAS, LLC, Seattle, WA (US)

( * ) Notice: Subject to any disclaimer, the term of this patent is extended or adjusted under 35 U.S.C. 154(b) by 0 days. days.

(21) Appl. No.: 14/701,426

(22) Filed: Apr. 30, 2015

(65) Prior Publication Data
US 2016/0321830 A1    Nov. 3, 2016

(51) Int. Cl.
G06K 9/00    (2006.01)
G06T 11/60    (2006.01)
G06K 9/46    (2006.01)

(52) U.S. Cl.
CPC ............ G06T 11/60 (2013.01); G06K 9/4671 (2013.01)

(58) Field of Classification Search
None
See application file for complete search history.

(56) References Cited

U.S. PATENT DOCUMENTS

| | | | |
|---|---|---|---|
| 8,379,874 B1 * | 2/2013 | Simon | H04R 27/00 381/1 |
| 2002/0034319 A1 * | 3/2002 | Tumey | G06K 9/00087 382/116 |
| 2004/0146159 A1 | 7/2004 | Rosen | |
| 2005/0063562 A1 * | 3/2005 | Brunk | G06K 9/00067 382/100 |
| 2006/0092476 A1 * | 5/2006 | Hilton | B42D 25/29 358/3.28 |
| 2006/0104484 A1 * | 5/2006 | Bolle | G06K 9/00885 382/115 |
| 2007/0230754 A1 * | 10/2007 | Jain | G06K 9/00093 382/125 |
| 2007/0242853 A1 * | 10/2007 | Rodriguez | G01S 19/14 382/100 |
| 2008/0089554 A1 | 4/2008 | Tanakin et al. | |

(Continued)

*Primary Examiner* — Nancy Bitar
(74) *Attorney, Agent, or Firm* — Ingram IP Law, P.A.

(57) ABSTRACT

The present disclosure is directed towards systems, methods and devices for tamper proofing documents by embedding data in a biometric identifier. The biometric identifier may be a real or synthetic fingerprint. In one non-limiting exemplary embodiment, a method for embedding data in a biometric identifier includes determining data to embed in the biometric identifier, determining at least one control parameter, and generating at least one biometric identifier feature. The method further includes including the at least one generated biometric identifier feature in the biometric identifier such that the determined data is embedded in the biometric feature. The determined data is based on a variable data stream. The control parameter controls the generation of at least one biometric identifier feature. The control parameter is based on the determined data. The generated biometric identifier feature is based on the determined control parameter.

25 Claims, 10 Drawing Sheets

(56) References Cited

U.S. PATENT DOCUMENTS

| | | | |
|---|---|---|---|
| 2008/0317299 A1* | 12/2008 | Kobashi | G03G 21/04 382/124 |
| 2009/0310831 A1* | 12/2009 | Zhang | G06K 9/00073 382/125 |
| 2010/0054551 A1* | 3/2010 | Decoux | G07D 7/00 382/124 |
| 2011/0002503 A1* | 1/2011 | Carr | G06F 17/30876 382/100 |
| 2013/0101186 A1* | 4/2013 | Walch | G06K 9/00093 382/125 |
| 2013/0177221 A1* | 7/2013 | Yalla | G06K 9/00 382/124 |
| 2014/0241597 A1 | 8/2014 | Leite | |
| 2014/0281568 A1* | 9/2014 | Ross | G06F 21/32 713/186 |
| 2015/0036894 A1* | 2/2015 | Matsunami | G06K 9/00885 382/115 |

* cited by examiner

SYSTEMS, METHODS AND DEVICES FOR TAMPER PROOFING DOCUMENTS AND EMBEDDING DATA IN A BIOMETRIC IDENTIFIER

FIELD OF THE INVENTION

The present disclosure relates to methods, techniques, devices and systems for tamper proofing documents and, more particularly, to methods, techniques, devices and systems for embedding data into biometric identifiers that are included in documents.

BACKGROUND OF THE INVENTION

Tamper-proofing information included in documents, such as travel documents, IDs, birth certificates, certificates of insurance, permits, licenses, and the like is an important aspect of the document security industry. Many security features have been suggested to enable security personnel to identify tampering of important document data.

One common method is to print a one- or two-dimensional bar code on the document. The authentication is usually performed by creating a data set that includes the important data fields of a document. This data set is embedded in a bar code that is included in a document. By decoding the bar code, the embedded bar code data may be compared to data included in the data fields of the document.

Another protection method is to embed data into the security image design using digital watermarking, and print the watermarked image. During verification, data is extracted from a scanned watermark, and compared to the data printed on the document. Another popular method is to use the optical watermarks, such as scrambled images, or images based on shifting, displacing, rotating, or modulating the size of the security screen elements to match the variable data content. A portion of the data content may be static data.

Many of these methods are well known in the industry, and are often based on simple modifications of the halftone screen elements, making them easy to replicate by forgers using widely available desktop image editing software. Bar codes of all types are easily available through many web services, which generate bar code images based on the data entered on a web form. Some of these methods are based on technologies that are proprietary, non-standardized, and difficult to evaluate independently, thus failing the well-known adage that obscurity is not security. Some methods use custom made authentication tools, which have to be distributed to all verification locations. Accordingly, a need to tamper proof documents still exists. It is for these and other concerns that the following disclosure is presented herein.

SUMMARY OF THE INVENTION

The present disclosure is directed towards systems, methods and devices for tamper proofing documents by embedding data in a biometric identifier. The biometric identifier may be a real or synthetic fingerprint. In one non-limiting exemplary embodiment, a method for embedding data in a biometric identifier includes determining data to embed in the biometric identifier, determining at least one control parameter, and generating at least one biometric identifier feature. The method further includes including the at least one generated biometric identifier feature in the biometric identifier such that the determined data is embedded in the biometric feature. The determined data is based on a variable data stream. The control parameter controls the generation of at least one biometric identifier feature. The control parameter is based on the determined data. The generated biometric identifier feature is based on the determined control parameter.

In various embodiments, the method further includes including a representation of the biometric identifier in a document. The representation of the biomarker includes the generated biometric feature. The document includes at least a portion of the variable data stream. The at least one control parameter may include at least one of an angle, a translation, or a shape descriptor of a silhouette of the biometric identifier. The at least one control parameter includes a plurality of two-dimensional points. Each of the plurality of two-dimensional points corresponds to a vertex of a polygon. The polygon approximates a silhouette of the biometric identifier.

In some embodiments, the at least one control parameter includes a plurality of frequencies. Each of the plurality of frequencies corresponds to a local frequency in a frequency map associated with the biometric identifier. In at least one embodiment, the at least one control parameter includes at least one two-dimensional point. The at least one two-dimensional point corresponds to a singularity in an orientation map associated with the biometric identifier.

Including the at least one generated biometric identifier feature in the biometric identifier includes generating a ridge map and modulating a phase of the ridge map. The ridge map is based on a blending of an orientation map with a frequency map. At least one of the orientation and the frequency maps is based on the at least one control parameter. The ridge map is based on the at least one control parameter.

In at least some embodiments, the at least one control parameter includes at least one two-dimensional point that corresponds to at least one minutia. Including the at least one biometric identifier feature in the biometric identifier includes including the at least one minutia in an initial biometric identifier, embedding the included at least one minutia, and optionally smoothing the ridge pattern in proximity of the at least one minutia.

The at least one control parameter may include at least one two-dimensional point that corresponds to at least one minutia. In at least one embodiment, the method further includes determining an orientation map and generating the biometric identifier. The orientation map is based on the at least one minutia. The biometric identifier is based on the determined orientation map.

In various embodiments, determining the at least one control parameter further includes determining a position for each of a plurality of two-dimensional points and determining a pore type for each of the plurality of two-dimensional points. Each of the plurality of two-dimensional points corresponds to a pore.

The method may also include generating a mask based on at least one image of the biometric identifier and masking at least one frame of image data with the generated mask. In other embodiments, the method includes generating a halftone image based on an image of the biometric identifier and other image data.

Some embodiments include a non-transitory computer-readable medium. The medium includes instructions that, when executed by a computing device, perform a method. The method facilitates embedding data into a biometric identifier, including, but not limited to the method discussed above.

In at least one embodiment, determining at least one control parameter includes determining at least a first and a second control parameter. The first control parameter corresponds to a first portion of the variable data stream and the second control parameter corresponds to a second portion of the variable data stream. Both the first portion and the second portion of the data stream are embedded in the biometric identifier. In various embodiments, at least one Level 3 fingerprint feature is included in at least one of the first portion or the second portion of the data.

Generating the at least one biometric identifier feature includes generating a Level One fingerprint feature and a Level Two fingerprint feature. The Level One fingerprint feature is based on the first control parameter. The Level Two fingerprint feature is based on the second control parameter. Including the at least one generated biometric identifier feature in the biometric identifier includes including both the Level One and the Level Two fingerprint features in a fingerprint. In at least one embodiment, the biometric identifier includes at least one Level Three fingerprint features.

Various embodiments include a computing system configured to facilitate methods for embedding data in a biometric identifier, such as the various methods discussed herein. The computing system includes a processor device, a memory device, and a memory that is stored by the memory device. The module is configured to, when executed by the processor device, to execute various methods of embedding data in a biometric identifier. The biometric identifier may be a microscopic identifier. When included in a microscopic identifier, the biometric identifier feature is not resolvable by an unaided human eye. The module is further configured to integrate the biometric identifier with image. Each of the biometric identifiers and the image data are separately resolvable when integrated.

BRIEF DESCRIPTION OF THE DRAWINGS

Preferred and alternative examples of the present invention are described in detail below with reference to the following drawings.

DETAILED DESCRIPTION

Figure 1:
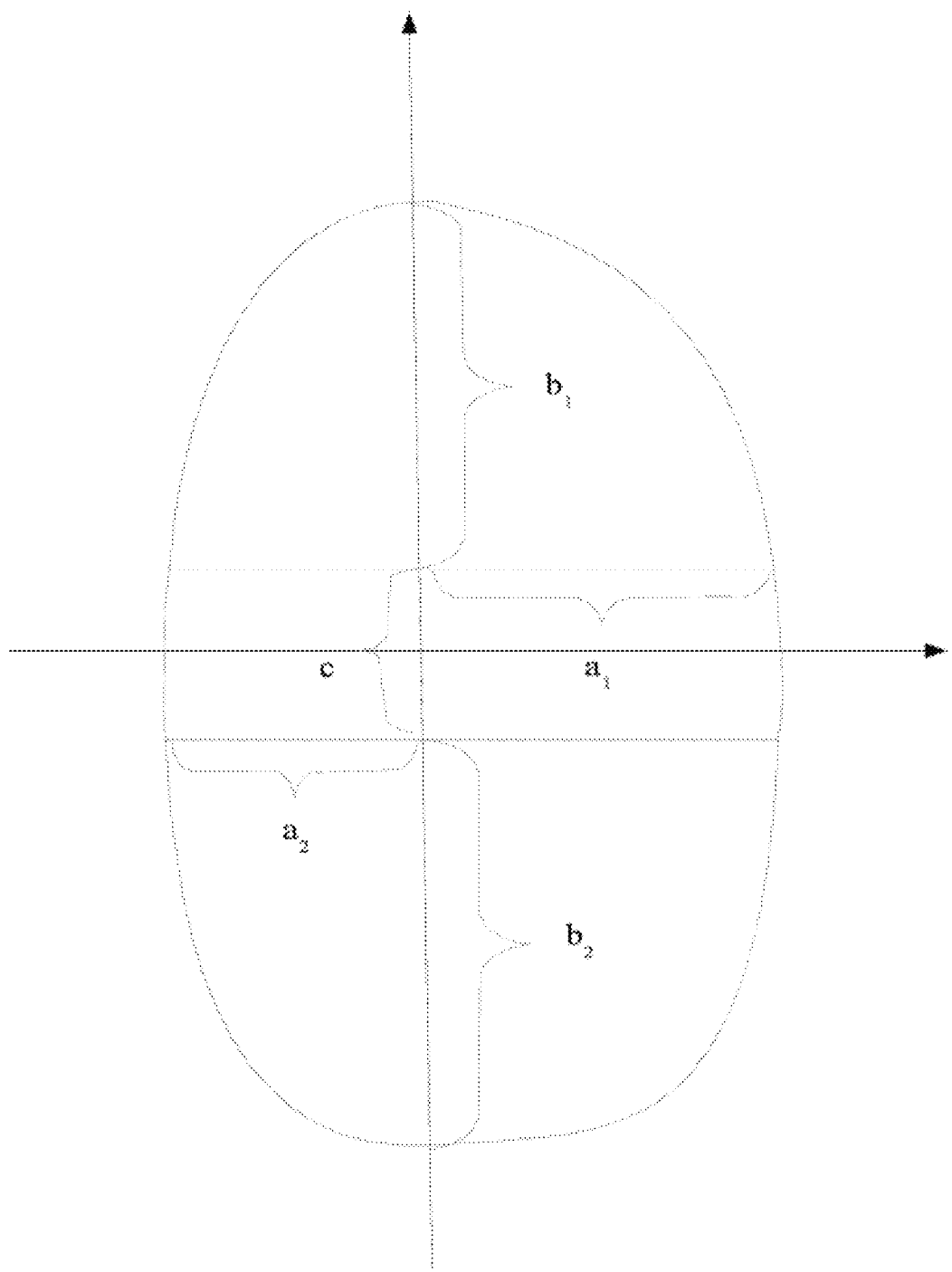
FIG. 1 shows an exemplary embodiment of Level One fingerprint features.

The system, method, and device embodiments disclosed herein enable the tamper proofing of documents. The tamper proofing embodiments are not easy to replicate or simulate by would-be document forgers. Biometric identifiers are employed in various embodiments. Many of the embodiments discussed herein employ fingerprints as one such biometric identifier. However, other embodiments are not so constrained and other biometric identifiers, including, but not limited to facial features, retina and/or iris features, DNA features, and the like, may be employed. In the various embodiments, data is embedded in a biometric identifier that is included in a document. For instance, a fingerprint image may be included in a license or passport document. When a party, such as law enforcement officer or customs agent, is processing the document, the included biometric identifier may be analyzed. Upon analysis, the embedded data may be extracted from the biometric identifier. The extracted data provides a mechanism to determine the integrity of the document.

In various embodiments, the biometric identifiers are "real" biometric identifiers that correspond to biometric data that identifies an individual associated with the document to be tamper proofed. For instance, a "real" fingerprint may be obtained from an individual through optical scanning, image sensing, or other means. Various features of the fingerprint may be generated, modified, varied, and/or updated. Such modifications enable the embedding of additional information in the real fingerprint. After such modifications, the fingerprint includes not only at least a portion of the biometric data that identifies the individual, but also the additional information that was embedded in the fingerprint. Upon analyzing such a modified real fingerprint, both the biometric data and the additional information may be extracted.

In other embodiments, "synthetic" biometric identifiers are employed. For instance, a "synthetic" fingerprint may be generated based on at least information to be embedded in the synthetic fingerprint. In various embodiments, at least other information that controls the generation of a synthetic fingerprint may be randomized information. The generated synthetic fingerprint resembles a real fingerprint, except it was not obtained from an individual, and thus does not include biometric information that identifies an individual. Rather, control parameters are used to generate the synthetic fingerprint. The control parameters employed to generate the synthetic fingerprint are dependent upon the information to be embedded in the fingerprint.

The biometric data included in a synthetic fingerprint may be analogous to randomized biometric data. Thus, a synthetic fingerprint may include essentially randomized biometric data and also additional information embedded in the fingerprint. As with a real fingerprint, when analyzed, the additional information embedded in the synthetic fingerprint may be extracted. However, the biometric information is essentially random data. Accordingly, the use of synthetic fingerprints protects the integrity of the real biometric data associated with an individual.

Various embodiments enable the tamper proofing of variable data included in documents by using the variable data to control features of either modified/updated real fingerprints or generated synthetic fingerprints. By controlling various features of the fingerprints based on the variable data, the variable data is embedded in the fingerprints. The variable data is employed to control a synthetic fingerprint generation. In various embodiments, the data to be embedded in the fingerprint is first encrypted, so that encrypted data is embedded in the fingerprint. In other embodiments, a hash of the variable data is embedded in the fingerprint.

The data to embed may include any digital data, including but not limited to textual, audio, or image/video data. The data may be represented as binary data or character strings. The data may include identification data such as names, ID numbers, account numbers, account balances, registration or license numbers, expiration dates, issuance data, place of birth, and the like. In at least one embodiment, a digital image, such as a photograph of a document bearer, may be embedded in the biometric identifier.

To analyze and extract the embedded information in the biometric identifier, standardized techniques may be employed. For instance, an optical scanner and fingerprint analysis software may be employed for fingerprint verification, authentication, and data extraction. Fingerprint sensors/scanners are already widely deployed at border crossings and security checkpoints. In at least one embodiment, an image sensor, such as those widely available in mobile devices, i.e. a camera phone, may be employed to scan a fingerprint image. Software modules, such as a mobile application are employed to analyze the scanned fingerprint that includes embedded data.

Fingerprint images, as well as other biometric identifier data are stored using recognized international standards. Accordingly, the various embodiments are easily implemented and deployed on already existing hardware, such as computing devices, optical scanners, printers, and the like.

For instance, analyzing fingerprint features on three separate and distinct levels is already a mature process. Level One fingerprint features describe the overall shape of the fingerprint, as well as the ridge flow pattern. Level Two fingerprint features relate to local disruptions in a ridge flow, often referred to as minutiae. Level Three fingerprint features relate to fine details along the ridges, such as sweat pores and local texture. Variable data is used to generate controlling parameters for synthesis of all three levels of fingerprint features. Accordingly, variable data is embedded into a fingerprint by utilizing Level One, Level Two, Level Three, or any combination thereof fingerprint features.

In addition to tamper proofing documents by embedding data into a biometric identifier, methods are disclosed to protect documents against scanning or other attempts to generate representations of the document. Small (compared to the resolution of currently available scanning devices) images of biometric identifiers may be cropped into, or otherwise included in the shape of some design elements included the document. For instance, a small synthetic fingerprint image may be cropped into a registration mark or another individualized marking included in the document.

Furthermore, images of biometric identifiers, such as either synthetic or real fingerprints may be integrated into a photograph or other image included in the document. Such integration of biometric identifiers and photographs may include simple masking or even halftone screen techniques. Such integration enables embedding variable data into the photograph by using synthetic fingerprints, or the merging of two biometric features by using a photograph and real fingerprints.

Embedding Data by Controlling Level One Fingerprint Features

Level One fingerprint features include the shape and position of the silhouette of a fingerprint. FIG. 1 shows an exemplary embodiment of Level One fingerprint features, i.e., a fingerprint silhouette. Level One features, include but are not limited to shape, orientation, and position of a fingerprint silhouette. The silhouette of FIG. 1 may be parameterized to embed information into the fingerprint by the choice of the control parameters. In FIG. 1, the shape of the fingerprint silhouette is parametrized by five shape parameters: $a_1$, $a_2$, $b_1$, $b_2$, and c. Treating these shape parameters as control parameters, information is embedded into a fingerprint by generating or updating a fingerprint to include a silhouette that is characterized by shape parameters that correspond to the embedded information. For instance, the range of each parameter may be quantized into a finite number of values. The quantization steps are based on the density of information to be embedded in the shape of the silhouette. For instance, each parameter may include 256 possible values. Accordingly, each parameter stores one byte of data. When the fingerprint is analyzed, the shape parameters are determined. The information that is embedded in choice of shape parameters is determined based on the values of the quantized shape parameters.

A synthetic fingerprint may be generated by employing any method of fingerprint generation, including but not limited to the well-known "Synthetic Fingerprint Generator" (SFinGe). When generating the synthetic fingerprint, the parameter values are generated, chosen, or adjusted to encode variable data. The values of the employed control parameters are based on the portion of the variable data stream that is encoded in Level One shape features.

In addition to the shape of the silhouette, the position and orientation that the fingerprint is placed in the document may be varied to embed data in the biometric identifier. For instance, the angle of the silhouette is quantized into discreet values over a predetermined angular range. One exemplary embodiment includes an angular range 0 to 90 degrees that is quantized in 2° bins. The choice of the angle of the silhouette is based on the portion of the variable data stream that is embedded in the angle of the fingerprint.

Furthermore, the position or location of the silhouette included in the document may be varied. For instance, the position is translated horizontally and vertically inside a predefined area field of the document. The horizontal and vertical translation ranges are also quantized over predetermined ranges. The amount of horizontal and vertical translation is based on the variable data stream to encode in the fingerprint.

A real or synthetic fingerprint silhouette may be isolated by fingerprint analysis software during the fingerprint segmentation. The shape and angle parameters are determined by image processing methods. In some embodiments, the silhouette is rendered on an axis of different angles to determine the silhouette projections by employing the same or finer resolution than the quantization steps employed during the angle encoding. The angle of a maximum projection determines the rotation angle. The size and shape of the maximum and minimum projections are employed to generate a system of linear equations that determine other shape parameters. The position of projections along the projection axis may be used to determine translation parameters. Accordingly, the data employed to determine the parameters that control silhouette shape, angle, and translation are extracted.

In other embodiments, Level One features are parameterized by modeling a fingerprint silhouette as a polygon. Information is embedded in the fingerprint by choosing the model parameters based on the information. For example, a polygonal contour with a predefined number of vertices may be smoothed to approximate a silhouette shape. The position of vertices of the polygon are described in two-dimensional Cartesian or Polar coordinates. During fingerprint generation or modification, the position of the two-dimensional vertices may be determined, updated, or otherwise modified to correspond to bits from the variable data stream to encode.

Starting with a predefined shape, such as the silhouette illustrated in FIG. 1, a polygon is determined. For instance, a polygon may be determined by employing vertices that are obtained by intersecting the contour with "rays" in quantized angular steps, for example at 5° steps in a Polar coordinate system. Such a polygon includes 72 two-dimensional vertices, or control parameters. By translating these vertices, along a radial line corresponding to the angular bin, closer or further to the reference shape, the variable data stream is encoded. For example, quantizing the radial position of each vertex to 8 values provides 3 bits for encoding. A polygon with 72 vertices enables 72*3=216 bits of encoding of the variable data stream. It should be understood that embodiments are not limited to the employment of polygons with 72 vertices, but more or fewer vertices may be employed based on the amount of data to encode or embed in the fingerprint. Also, more bits may be encoded in each vertex by using a higher resolution quantization of the radial position of each vertex.

Control parameters based on polygon vertices and other parameters related to shape, orientation, and position descriptors may be determined and employed to generate a contour, such as a centroidal profile, chain code, and the like. Such contours may be employed in a similar fashion to embed or encode variable data into Level One features of a fingerprint. When analyzed, each of these shape descriptors is determined from a segmented fingerprint image using image processing methods. Accordingly, fingerprint analysis are employed to determine the embedded data.

Another Level One feature that various embodiments employ to embed data is a local frequency map over the fingerprint image. The frequency map is generated based on the ridge/valley period found in typical human fingerprints (about 9 pixels for a 500 dpi sensor or scanner). Small random variations are introduced across the image when a synthetic fingerprint image is generated. The frequency map may be referred to as a field of periods.

Data is encoded by employing the data in the generation of a frequency map. Rather than random variations of frequency in local areas, a grid, or some other quantized two-dimensional structure, is imposed on an image field of a fingerprint. The grid or quantized two-dimensional structure may be a square, hexagonal, or any other predetermined type of grid. The variations in ridge/valley frequencies across the grid are based on the data stream to encode.

In the case of real fingerprints, the ridge/valley frequencies typically vary between seven and thirteen pixels on standard optical scanners. Since synthetic fingerprints are not required to match a real fingerprint frequency range, the larger frequency range may be used. This otherwise random frequency variance is controlled deterministically across the fingerprint grid to encode data.

In one exemplary embodiment, the frequency is varied locally by 6 to 13 pixels to encode data. By employing an 8×8 grid and varying the frequency across the quantized regions (or grid blocks) between a 6-13 pixel range, 192 bits of variable data (three bits are encoded by each of eight frequency values, and 64 blocks of three bits are used) may be encoded. Employing a greater frequency range or a finer resolution grid enables encoding a greater volume of data. When the generated fingerprint is analyzed, the frequency of each grid block or tile is determined to decode or extract the embedded data.

An orientation field is another Level One feature that is generated, modified, or otherwise updated to embed data into a fingerprint. The number and location of poles in a complex orientation field associated with a fingerprint is controlled based on the data to embed. First, a class of the fingerprint is determined based on the information to embed. Such fingerprint types include, but are not otherwise limited to an arch, tented arch, left loop, right loop, whorl, double loop, and the like. With the exception of an arch, which has no singular points, these classes are characterized or parameterized by the presence, number, and position of singular points, referred to as cores and deltas. For example, a left loop has one delta and one core, the core being located to the left of delta. Such singular points define poles in an orientation map plotted in a complex plane.

Fingerprint class, and the relative positions of the singular points are used to model and generate the orientation field. Each point in the two-dimensional orientation field is defined by a complex number. The orientation field is defined by each of the included poles. Each included pole is either a delta type pole or a core type pole. The orientation map is determined by calculating an orientation angle, θ, at each point in the complex plane z:

$$\theta = \frac{1}{2}\left[\sum_{i=1}^{n_d} \arg(z - ds_i) - \sum_{i=1}^{n_c} \arg(z - cs_i)\right],$$

where $n_d$ is the number of delta type poles, $n_c$ is the number of core type poles, $ds_i$ is the ith delta type pole, and $cs_i$ is the ith core type pole in the complex plane. In preferred embodiments, the orientation angle, θ, is determined for each pixel in the fingerprint image, generating a field.

When encoding data in a fingerprint, each of the control parameters in the above definitional equation is chosen/determined based on variable data stream. Once determined, the control parameters are employed to generate, update, or modify the fingerprint. The position of the singularities/poles is assigned within a predetermined and quantized range for each class. The quantized values of the horizontal and vertical placement for each singularity/pole is assigned based on the part of the data stream to be encoded in the orientation field. By extracting the orientation field from the fingerprint image, the class of the fingerprint is determined. The location of each singularity is determined via a fingerprint analysis. Extracting this information enables the determination/extraction of the information embedded in the fingerprint.

Embedding Data by Controlling Level Two Fingerprint Features

Level Two features of fingerprints are also controlled to encode data into the fingerprints. Such Level Two features include, but are not otherwise limited to, fingerprint minutiae. During the generation of synthetic fingerprints, or the updating/modifying of real fingerprints, the number, type, position, and angle of minutiae included in a fingerprint may each be varied to encode data.

Synthetic fingerprints may be generated by employing a constructive approach. A fingerprint is described by a wave pattern. The phase of the wave pattern is decomposed into two separate phases: a continuous phase and a spiral phase. The continuous phase is associated with the global ridge pattern of the fingerprint, while the spiral phase is associated with the fingerprint's various minutiae (ridge endings and bifurcations). The continuous phase may include a slowly changing phase component while the spiral phase includes a quickly changing phase component.

In various embodiments, a starter image that includes a ridge image is generated by fusing and/or smoothing various Level One features, such as the orientation field and frequency map described above. The phase of this ridge image is modulated to introduce minutiae information. In other embodiments, a synthetic fingerprint is generated by starting with minutiae that are determined by the data to be encoded. The best fit local representation of the orientation field that approximates the minutiae parameters is determined.

Figure 2B:
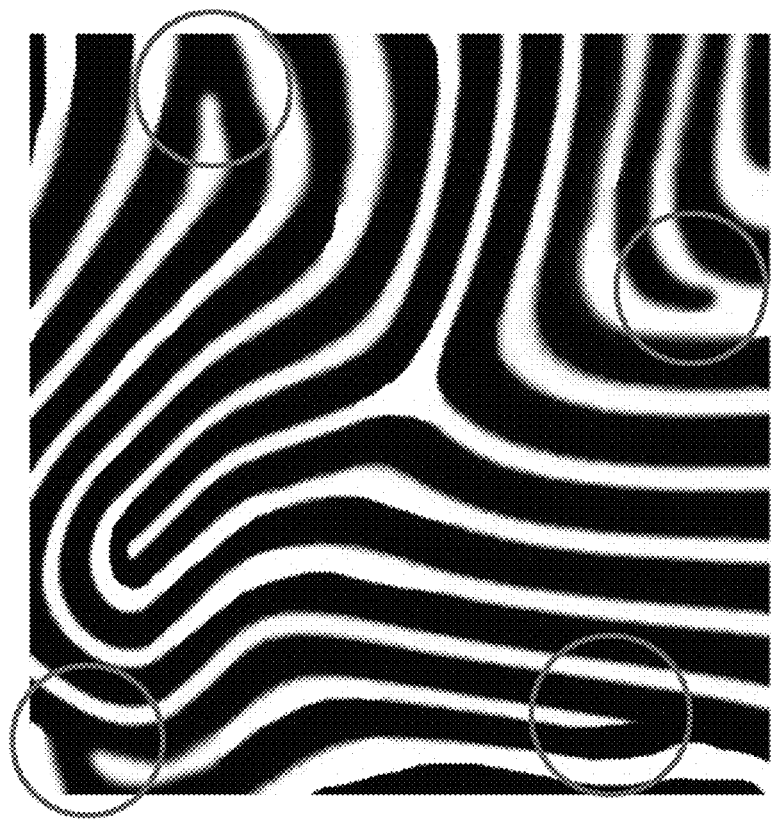
FIG. 2B shows the fingerprint of FIG. 2A, where data has been embedded into the fingerprint by inserting four minutiae into the ridge pattern.
Figure 2A:
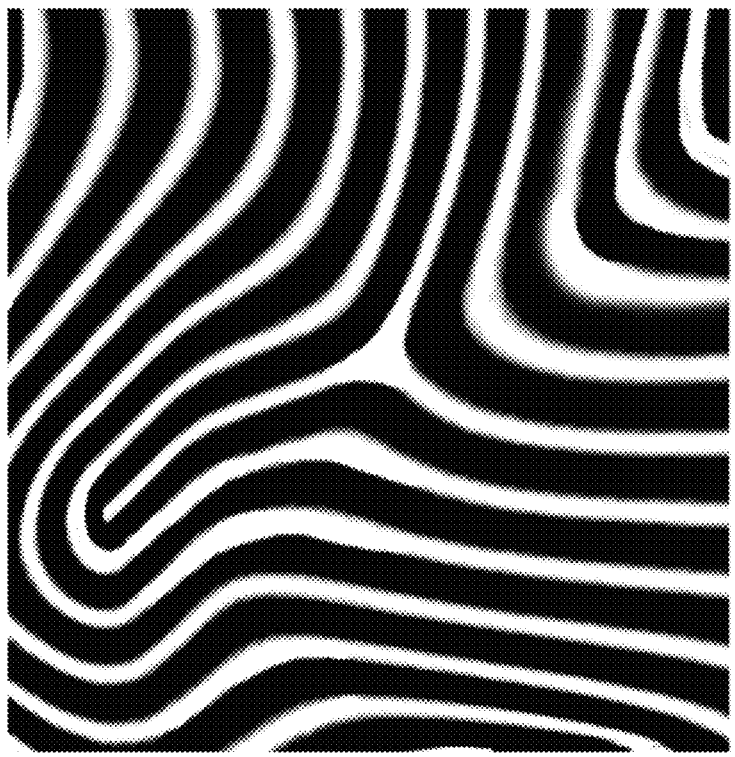
FIG. 2A shows a synthetic fingerprint that includes a ridge pattern.

In still other embodiments, a local modulation of the starter ridge image is employed to embed data in the fingerprint. Such embodiments include the direct insertion of minutiae into a fingerprint. These embodiments are implemented by employing morphological filters matched to the different types of minutiae. The local ridge patterns in proximity of minutiae are then smoothed to improve the appearance of minutiae at the insertion points. For instance, FIG. 2A shows a synthetic fingerprint that includes a ridge pattern. FIG. 2B shows the fingerprint of FIG. 2A, where data has been embedded into the fingerprint by inserting four minutiae (highlighted by the circles) into the ridge pattern.

Figure 3B:
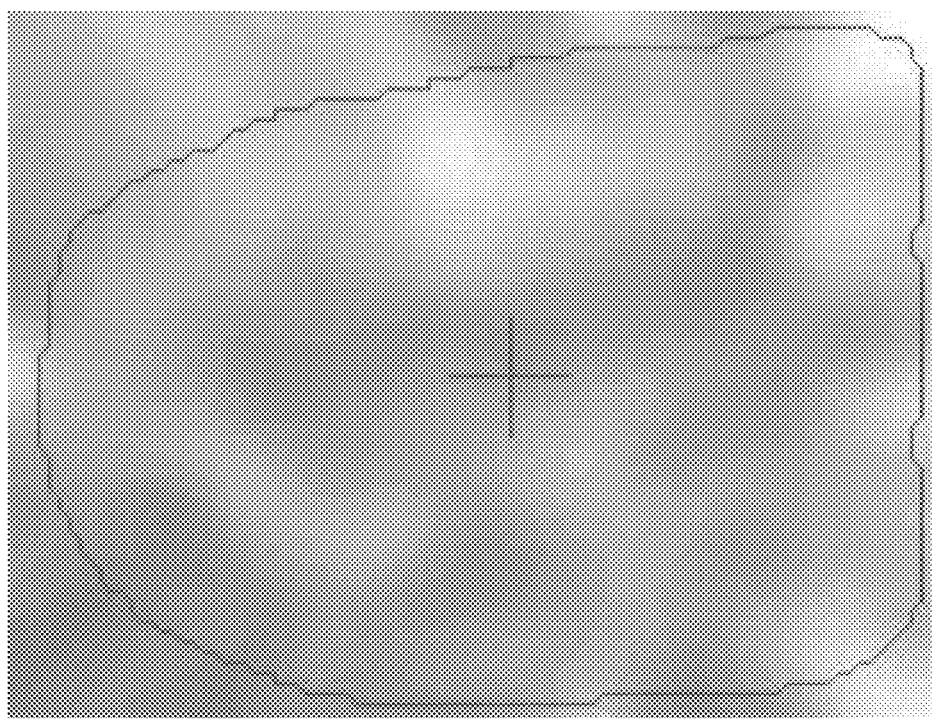
FIG. 3B shows the corresponding fingerprint silhouette and field of periods of the fingerprint of FIG. 3A, both of which are controlled by control parameters to further embed additional variable data into the fingerprint.
Figure 3A:
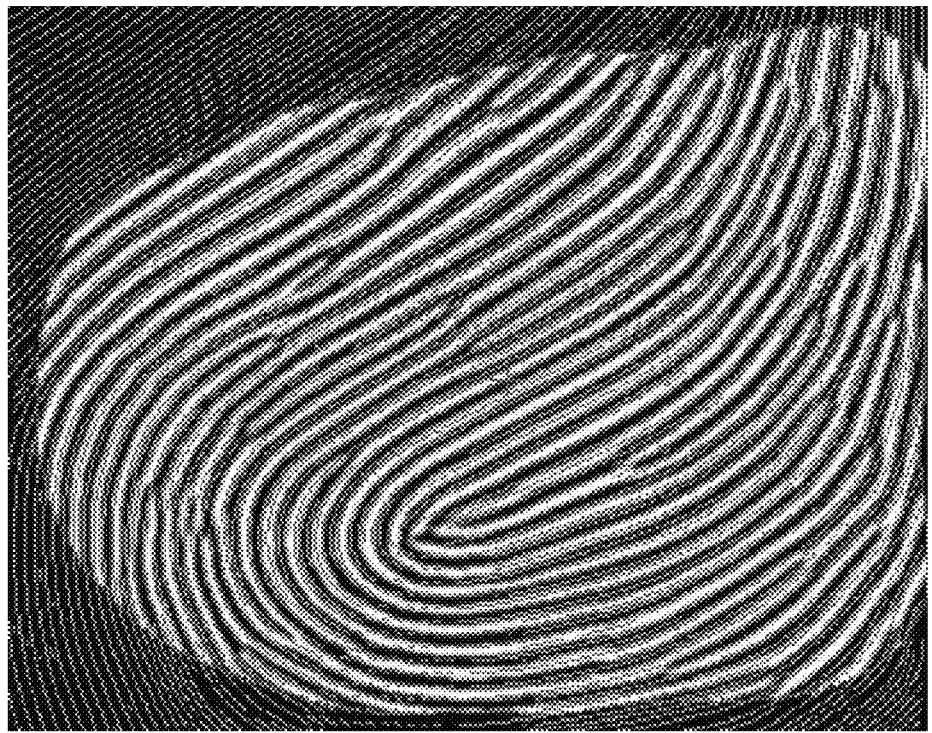
FIG. 3A shows an orientation field based on control parameters that depend upon variable data to be embedded in a fingerprint.

Any other method of generating the synthetic fingerprint images that can accurately place minutiae inside the fingerprint may be used to embed portions of the variable data stream into Level Two features. FIG. 3A shows an orientation field (Level One feature) based on control parameters that depend upon variable data to be embedded in a fingerprint. Also shown in FIG. 3A is the fingerprint that corresponds to the orientation field. The fingerprint is superimposed upon the orientation field. Additionally, minutiae (Level Two feature) that correspond to additional variable data to embed, has been added to the shown fingerprint. FIG. 3B shows the corresponding fingerprint silhouette (Level One feature) and field of periods (Level One feature) of FIG. 3A, both of which are controlled by control parameters to further embed additional variable data into the fingerprint. Accordingly, the variable data embedded in the fingerprint of FIG. 3A has been embedded by controlling and/or manipulating both Level One and Level Two fingerprint features.

Controlling or otherwise choosing minutiae control parameters provide larger embedded data payloads compared to Level One features. Controlling and/or modifying minutia type (ridge end or bifurcation), minutia position, minutia angle, and/or minutia angle modification relative to the local orientation field, enables embedding variable data. Orientation field, minutia type, angle and position are fingerprint features that are readily determinable under fingerprint analysis. Accordingly, the control parameters that control for these features are decodable under standard fingerprint analysis software packages. Accordingly, the embedded data is readily extractable and/or determinable from such biometric identifiers.

In a simple, but non-limiting embodiment, 100 minutiae are added to a fingerprint. For instance, a 10×10 grid may be imposed on a fingerprint and a single minutia is included in each block. The position of the minutia within the block is assigned to one of 16 possible positions (4 bits), such as if a 4×4 sub-grid was imposed upon each block. The angle relative to the local orientation field is modulated by 8 possible values (3 bits). Minutia type for each minutia is controlled by two possible values (1 bit). Accordingly, up to 100×(4+3+1)=800 bits of data may be encoded in this exemplary embodiment. It should be understood that the density of each of these quantization of values may be increased to embed data of a higher data rate.

Ridge endings and bifurcations are commonly used minutia types in fingerprint analysis. In addition to these features, other minutia types exist, and each may be introduced into the synthetic images. Some examples of these additional types include crossovers, deltas, hooks, eyes, islands, bridges, enclosures, and the like. Other features, such as creases, may be added to the synthetic fingerprint image to embed larger amounts of data. The type, position, and orientation of each of these minutia types may also be chosen based upon portions of the variable data stream that is to be embedded.

Embedding Data by Controlling Level Three Fingerprint Features

Figure 4:
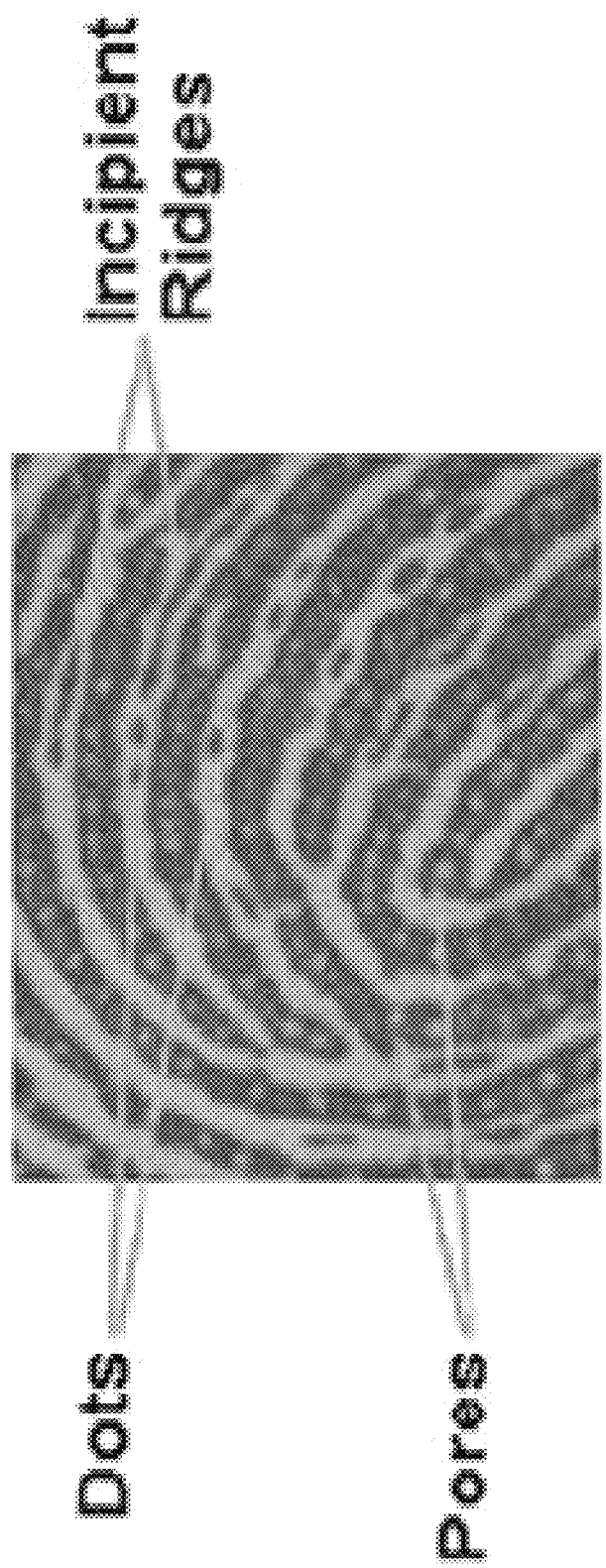
FIG. 4 illustrates various Level Three fingerprints features.

Level three features include very fine fingerprint details, such as sweat pores, incipient ridges, small dots, and the like. The number of these features in any given fingerprint is large. Accordingly, the control and/or modification of Level Three features in fingerprints are used to encode large volumes of data, particularly compared to encoding data by controlling Level Two features. For example, sweat pores may be used to embed data into a fingerprint by controlling or varying a particular pore's position along a ridge. Furthermore, the pore type (open or closed) may be deterministically controlled or assigned. The number of pores are measured in the tens of thousands in a single fingerprint image, resulting in enabling the encoding of large amounts of data. FIG. 4 illustrates various Level Three fingerprints features. FIG. 4 includes labelling for multiple instances of dots, pores and incipient ridges.

The physical feature sizes of Level Three features are smaller than both Level One and Level Two features. Accordingly, printing and analyzing printed Level Three features require high quality hardware, such as high resolution printers and scanners. Accordingly, depending on the size of the data stream to embed, encoding information via the control or modification of Level Three features is optional in the various embodiments. In at least some embodiments, an enlarged real or synthetic fingerprint image is included in a document. Level Three features may be more readily embedded, scanned, and resolved in an enlarged image.

Employing Biometric Identifiers to Enhance Resistance to Scanning Documents

In addition to embedding data, biometric identifiers are employed to protect documents against scanning. For instance, the inclusion of a high-resolution image of a real or synthetic fingerprint, with high ridge frequency (on the order of hundreds or more ridges per inch) in a document renders the document difficult to scan. At least one embodiment employs a small fingerprint image with just a few minutiae. The fingerprint image is cropped to match the shape of another image element included in the document, such as a registration mark or a design element.

The included fingerprint image may be small enough such that the fingerprint image details (ridge patterns, minutiae, pores, and the like) are invisible to the naked eye. Such a fingerprint may be a microscopic fingerprint. Small size and high density of details/features render such an image of a fingerprint difficult to scan or otherwise reproduce. Documents including such an image would therefore be resistant to scanning technologies that are unable to resolve such features.

In preferred embodiments, the size of the fingerprint image is on the order of millimeters. The fingerprint image also includes embedded data. The volume of data that may be encoded into such a small image is limited to few bytes. However, the variability afforded by just a few bytes and the small image size provides a strong forensic security feature.

Figure 5:
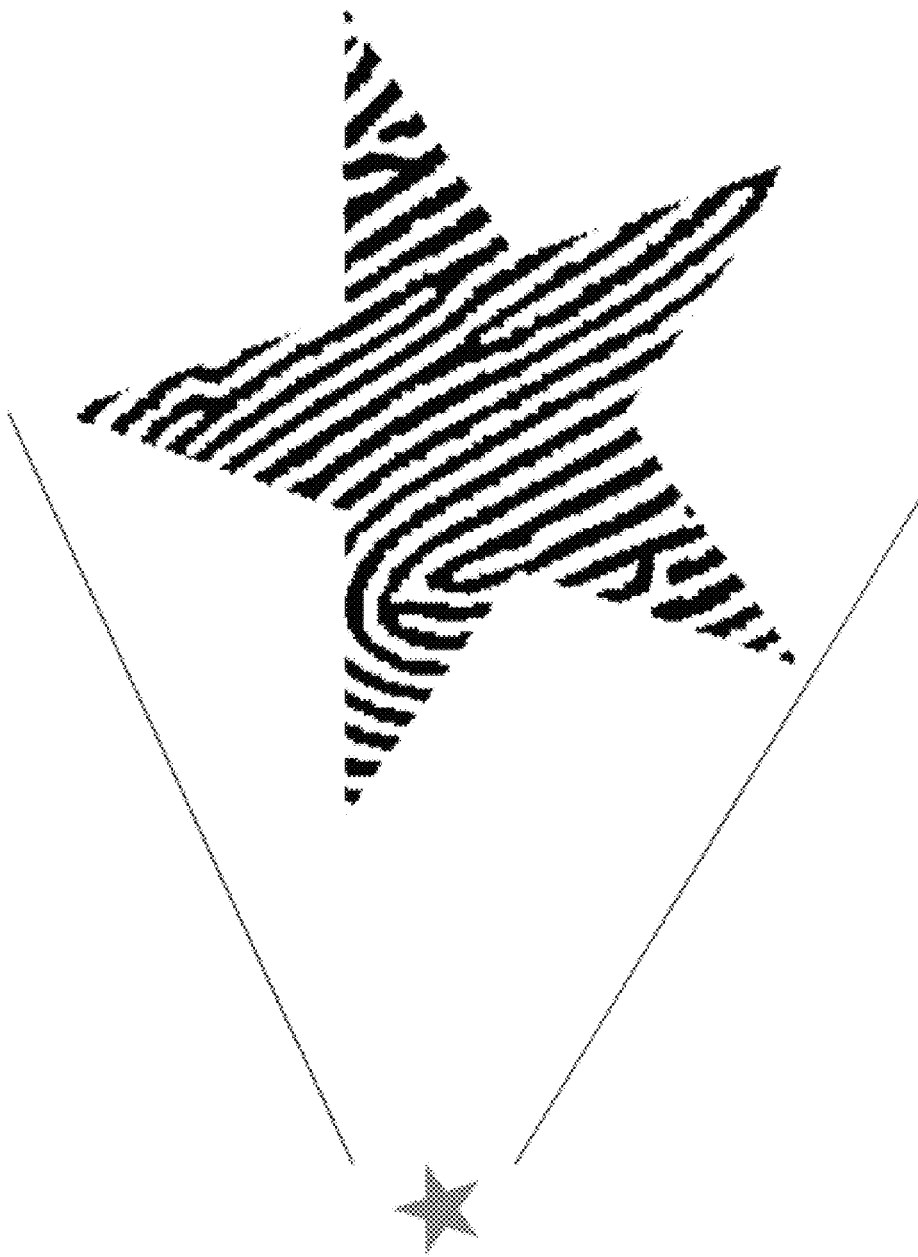
FIG. 5 illustrates a small image element that includes a microscopic fingerprint with embedded data.

FIG. 5 illustrates a small image element that includes a microscopic fingerprint with embedded data. An image of a star is shown on the left side of FIG. 5. As shown, a human eye cannot resolve the detail embedded in the star. However, the right hand portion of FIG. 5 shows the same star, wherein the size of the star has been enlarged. The enlarged image of the star reveals an embedded synthetic fingerprint. When printed as a 2 mm×2 mm image, the ridge frequency for this image is about 315 lines per inch. Such a ridge frequency is difficult to accurately scan with currently available scanning technologies. If the design limitations require larger images, the high density of details/features of a biometric image measured in large lines per inch frequency are preferably preserved to maintain scan resistance. These images may be referred to as microscopic fingerprints because of the microscopic size of the ridge details.

Integrating Biometric Identifiers with Image Data

Protecting image data, such as a photograph of a document bearer, is an important element of document security. A common attack on a travel document, such as a passport, is a photo substitution. Accordingly, embodiments wherein a biometric identifier is integrated with the image data provide security measures or features for the image data. Furthermore, the biometric identifier may be embedded with information that corresponds to the image data, such as a name, social security number, birthdate, or other information that corresponds to a person depicted in the image data. Security features that render it more difficult to replace a photo on a genuine document with an imposter's photo are a crucial part of a document protection.

In various embodiments, fingerprint images (real or synthetic) are merged or integrated with image data, such as a photograph, generating image data to be included in a document. It should be recognized that any method of merging or blending a first image data set with a second image data set may be employed to achieve such an integration. Non-limiting examples of such image merging include, but are not otherwise limited to, employing an optical mask and employing a halftone screen.

For instance, a fingerprint image (first set of image data) may be employed as an optical mask applied to a photograph (second set of image data). A fingerprint image is decomposed into an image that includes two elements: ridges and valleys. In some embodiments, the ridges included in the fingerprint image are selected as the non-transparent masking elements, while the valleys are the transparent elements. In other embodiments, the valleys are non-transparent and the ridges are transparent. Transparency levels preferably vary between 0 and 100%, as long as there is a distinction between the transparency of the ridges and valleys.

When applied as a mask, the binary fingerprint mask image enables portions of the original photo to be conserved (those that correspond to the more transparent portions of the mask), while blocking out the other portions (those that correspond to the less-transparent or non-transparent portions or elements of the mask). In at least one embodiment, the roles of the two image sets are inverted: the original photograph is employed as a mask that is applied to the fingerprint image.

In various embodiments, the contrast of the original photo is reduced during the masking process because only portions of the original photo are conserved for printing. Accordingly, masking is particularly suitable for protecting ghost images (which are often included in travel documents such as passports), or other image types, wherein the reduction of contrast is not critical.

Masking may be employed to protect color, grayscale, binary, and/or monochrome image data. Synthetic or real fingerprints may be employed in such methods. In various embodiments, data may be embedded in the masking fingerprints, such as in at least controlling the Level One and/or Level Two fingerprint details. Depending upon the size of the original photo, as well as the ridge/valley density of the fingerprint, and the targeted resolution of the integrated image, multiple instances of fingerprint images may be tiled to generate the mask. Each instance of a masking fingerprint image may be a separate fingerprint, or each instance included in the tile pattern may be an identical fingerprint. A combination of real and synthetic fingerprints for tiling may be used. The total amount of embedded data may be increased by embedding separate portions of the data stream into the different fingerprint tiles. In other embodiments, the same data is embedded in each masking fingerprint image. This increases redundancy and secures the embedded data from data loss or corruption.

Figure 6:
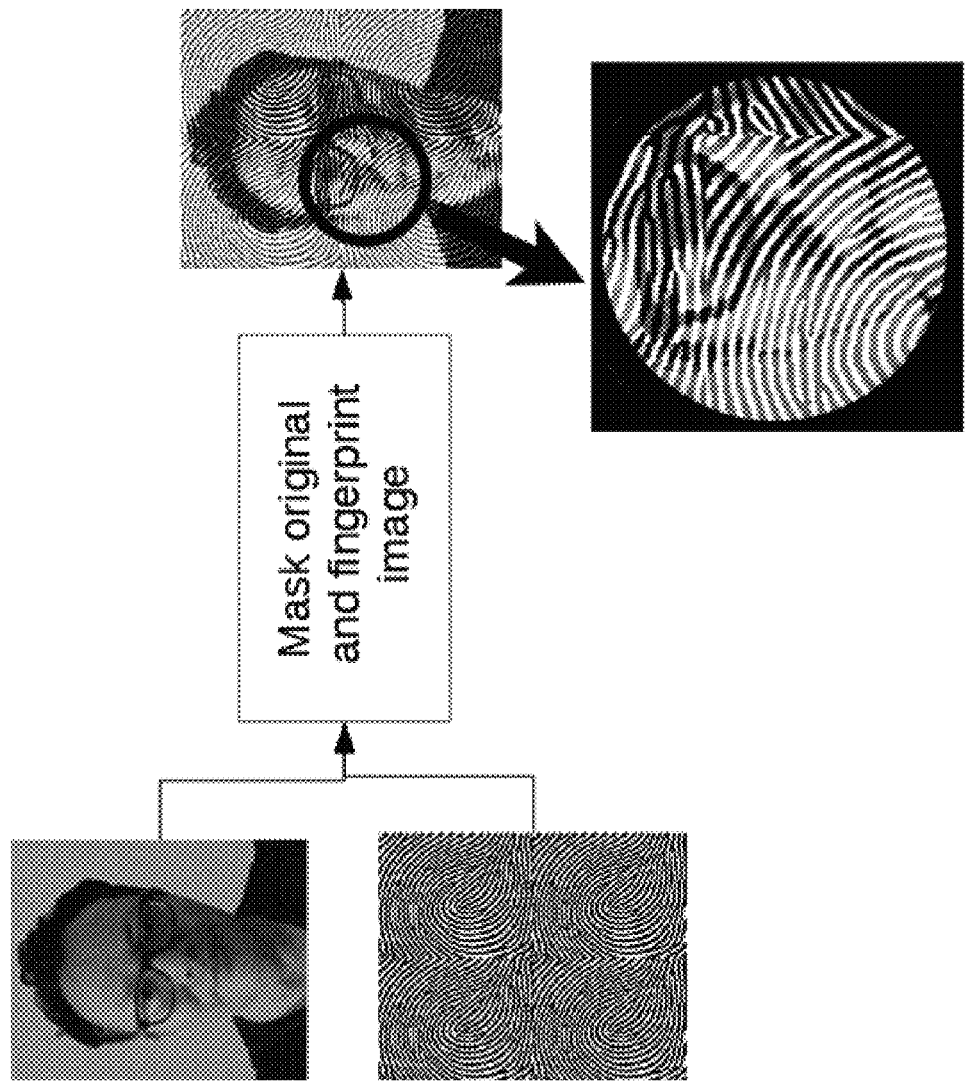
FIG. 6 shows a process that includes employing a 2×2 tiling of a fingerprint image to generate a mask applied to image data that includes a document bearer.

FIG. 6 shows a process that includes employing a 2×2 tiling of a fingerprint image to generate a mask applied to image data that includes a document bearer. Upon applying the mask, a new image is generated wherein features of the fingerprint image tiling, as well as the original photo are discernible. An enlargement of the new image is shown in the lower right hand corner, illustrating that data embedded in the fingerprint image is resolved and/or extractable from the new image.

In other embodiments, fingerprint images are employed as halftone screens to integrate biometric identifiers with image data. In the printing industry, halftone screens are routinely generated by employing lines, dots, diamonds, or other similar geometric image elements. The size of the individual halftone elements is adjusted proportionally to the density of the original image in the corresponding area. For example, in darker portions or regions of the original image, the size of the halftone elements, such as dots, are increased in the corresponding region of the halftone image. Increasing the size of each individual halftone element in the regions generates a darker region in the halftone image. Likewise, in the brighter regions of the original image, the size of the halftone elements are decreased. When the halftone screen elements are small enough, the human eye cannot distinguish individual elements, but interpolates them to create a perception of a brightness level. Typically there are about 120-220 halftone elements per inch on a printed halftone image. In security printing industry, micro-text is sometimes used as a halftone screen. The individual letters are made thicker in darker parts of the image, and thinner in brighter parts of the image.

In various embodiments disclosed herein, fingerprint images are employed as a halftone screen. The ridges are transformed to be thicker in the portions that correspond to the darker portions of the image. Similarly, the ridges are transformed to thinner ridges in the portions that correspond to the brighter portions of the image.

Both the fingerprint image and the original image to be halftoned are subdivided into halftone cells of the same size and orientation. The average density of the original image is determined for each of the halftone cells. The ridge elements inside each halftone cell are made thicker or thinner by adding or deleting pixels to them until the ridge elements match the density in the corresponding cell of the original image.

Figure 7:
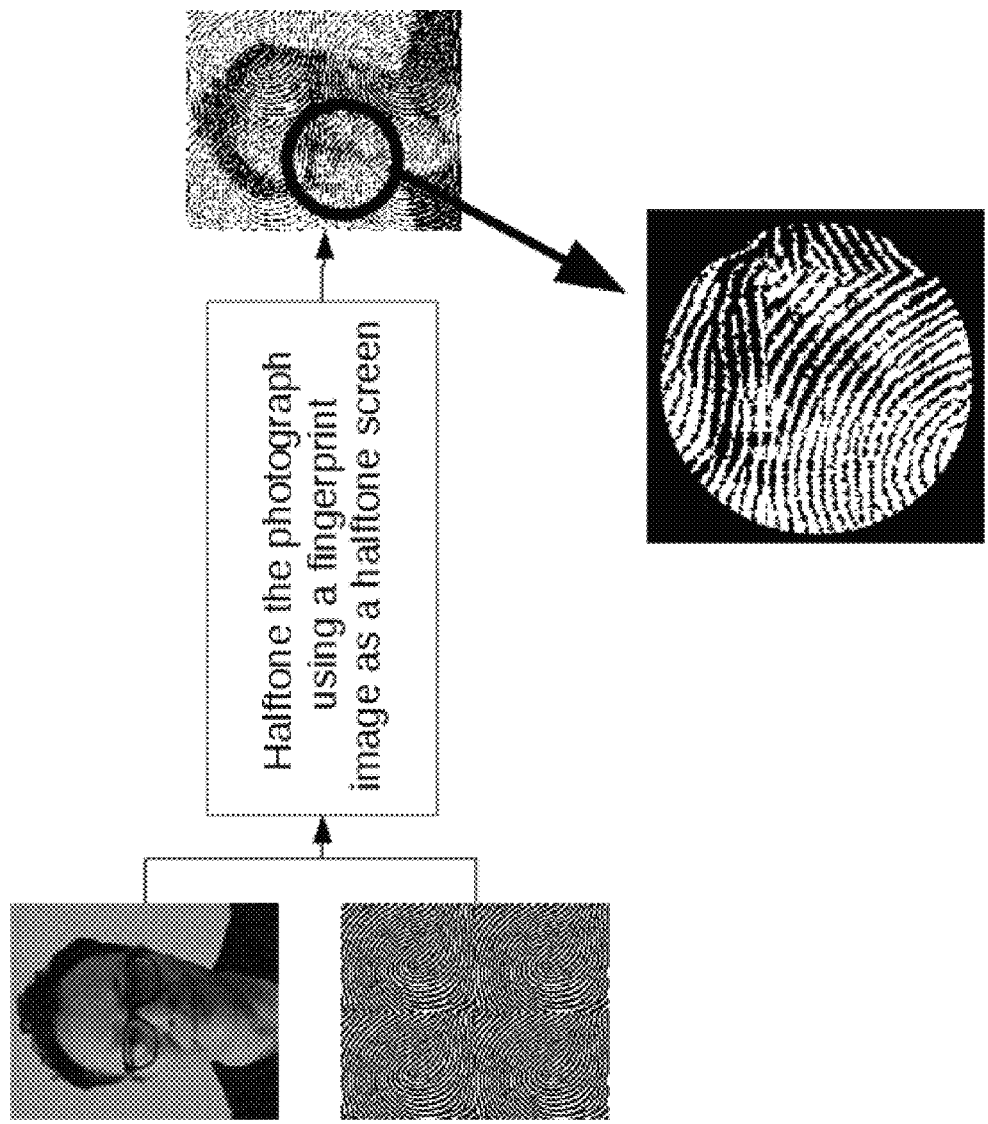
FIG. 7 illustrates a process that includes employing a 2×2 tiling of a fingerprint image to generate a halftone screen that integrates the features of the fingerprint image with image data that includes a document bearer.

FIG. 7 illustrates a process that includes employing a 2×2 tiling of a fingerprint image to generate a halftone screen that integrates the features of the fingerprint image with image data that includes a document bearer. Similar to the masking method, both real and synthetic fingerprint images may be used. An enlargement of the halftone screen image is shown in the lower right hand corner, illustrating that data embedded in the fingerprint image is resolved and/or extractable from the new image. Accordingly, images of biometric identifiers, such as real or synthetic fingerprint images may be embedded in or integrated with other images.

When synthetic fingerprint images are employed, variable data, such as date of birth, name of a document bearer, or the like may be embedded or encoded into the synthetic fingerprint structure, by the various embodiments disclosed herein. Accordingly, personal information is integrated into the photo structure, creating a strong link between the personal data and the photograph. Tampering either with a photograph or with data included in a document that includes the photograph will be easily revealed. If a photo substitution is attempted, the replacement photograph will lack the fingerprint structure corresponding to the other data included in the document. If personal data included in the document is tampered with, the edited document data will not correspond to the extractable data embedded in the synthetic fingerprint images integrated with the photograph. If real fingerprint images of a document bearer are integrated into the photograph, these will merge two biometric features (fingerprints and facial features) together, significantly increasing the security of the personalized documents.

In some embodiments, the contrast of the original image is enhanced by employing at least one of histogram stretching, equalization, or adaptive contrast enhancement techniques prior to the original image being merged with the fingerprints. The ridge frequency of the integrated fingerprint images may be increased so as to be greater than the frequency of natural fingerprints. In various embodiments, increasing the ridge frequency is beneficial in preserving image details included in the original image. Employing at least eighty ridgelines per inch preserves enough image details to create ghost images of sufficient quality for most documents. The frequency is adjusted by adjusting or varying the control parameters of the fingerprint synthesis software, or simply by rescaling the fingerprint image.

Securing Document Fidelity by Employing Biometric Identifiers

Data may be embedded into both real and synthetic fingerprints by controlling Level One, Level Two, Level Three, or any combination thereof of fingerprint features. A preferred embodiment includes controlling and/or modifying a combination of Level One and Level Two features to generate or modify fingerprints. Upon fingerprint analysis these Level One/Two controlled features are detected. The corresponding control parameters are determinable by employing methods available in fingerprint analysis software. Decoding or extracting the variable data stream is a reliable procedure. For instance, by employing a combination of Level One and Level Two details, at least a 1,024 bits (128 bytes) of variable data is readily embedded into and extracted from a fingerprint image.

As per the PIV-071006 specification, a capture size area for the single human fingerprint flat impression is approximately 0.5×0.65 square inches. The data payload volume is readily increased by increasing the capture area (allowing a greater number of embedded features) or by increasing the number of fingerprints that are employed. For instance, if the capture area is increased by approximately a factor of 3 in each dimension, the embeddable data payload is increased to about 1 KB, which is large enough to embed a JPEG-2000 compressed photograph. Accordingly, a photograph may be embedded in a fingerprint image, wherein the photograph is not visible to a human observing the fingerprint image.

In other embodiments, Level Three features are controlled to generate or modify a fingerprint that includes embedded data based at least on Level Three features (or the parameters that control the Level Three features). A high-resolution printer or laser engraving equipment is employed to accurately reproduce images of the generated fingerprint that includes the controlled Level Three features. Thus, data is encoded into synthetic fingerprint images that correspond to an image size commonly associated with fingerprint images. Employing a rolled form of a synthetic fingerprint increases the data payload: a single rolled fingerprint image may include at least 150-200 minutiae.

Employing synthetic fingerprints, as compared to real fingerprints, provides several benefits in various embodiments. In some embodiments synthetic fingerprints will not be evaluated by the human experts, so the controlling parameters do not need to adhere to the range of values for which the human experts are trained. Furthermore, synthetic fingerprints enable increasing the density of included features. For instance, by employing larger fingerprint images or otherwise deviating from the appearance of a typical human fingerprint, the available storage space for the data payload is increased. Accordingly, synthetic fingerprints provide a greater density or total volume of embedded data streams.

The nature of some fingerprint features may introduce limitations when combining features from various levels. For example, inserting minutiae (Level Two features) into the orientation field (Level One feature) may generate a break in a field of periods proximate to the inserted minutiae. However, this effect may be mitigated by employing larger quantization steps in frequency. Such less dense quantizations enable the more accurate measurement of the frequencies and the process is more robust to the presence of minutiae. Accordingly, both field of periods and the addition of minutiae may be simultaneously employed to encode larger streams of payload data.

The robustness of the variable data stream may be increased prior to encoding. For instance, Reed-Solomon codes or other EDAC (Error Detection and Correction) methods may be applied to the data stream prior to encoding and generating the fingerprint. Accordingly, the encoded data will be reliably read or extracted, even if some parts of the printed synthetic fingerprint image are obstructed, damaged, or otherwise corrupted.

The encoded synthetic fingerprints may be deployed in digital format, such as by inserting or otherwise including the corresponding digital data in electronic documents, such as word processing documents. Digital data that corresponds to biometric identifiers may also be included in RFID chips, such as those often employed in smart cards, or in any other data storage that utilizes non-volatile digital memory to store data. The embedded data may be extracted from the digital representations of the fingerprints as readily as from images of the fingerprints, via digital processing techniques.

The encoded synthetic fingerprints may be generated by employing a variety of software configurations. In some embodiments, a web service is deployed. A client provides an electronic document to be secured via a web client/server architecture. A synthetic fingerprint is generated based on control parameters that are in turn based on the content of the predetermined fields in a document. In at least one embodiment, the content is determined by scanning the documents and applying Optical Character Recognition (OCR) techniques to the data fields. The generated synthetic fingerprint is inserted into a header, a footer, or a watermark included in the document. Once the document includes the fingerprint, the document is provided to the client and/or printed. In alternative embodiments, specialized software is configured to embed the encoded synthetic fingerprint generation directly into the document printing system, or even inside the printer driver.

If the encoded synthetic fingerprint is printed on a document, decoding will require image acquisition of the fingerprint. Image acquisition is performed via a desktop scanner, passport or card reader, smart-phone camera, digital camera, analog camera combined with a frame grabber, or any other such combination of image data sensors. The acquired images are provided to a decoding module. The decoding modules may be included in the acquisition device (desktop PC software or mobile application, such as smart-phone software). In alternative embodiments, at least a portion of a decoding module is located on a remote device, such as a server device. Image acquisition may include employing OCR, bar code reading, smart-card reading, or other methods to retrieve data that has to be checked. Other information included in the document, such as bearer's name, passport number, and the like is compared with the data extracted from the features of the encoded synthetic fingerprint to detect if any data-tampering has occurred. In at least one embodiment, the fingerprint image is encoded with a hash of other information included in the document.

In order to use microscopic fingerprint images, specialized printing hardware may be employed. Such hardware includes, but is not limited to ink jet printers with 1200 dpi resolution or laser engraving systems with 1000 dpi or better resolution. Alternatively, microscopic fingerprint images may be used as a static feature, without embedding variable data. Such static images are printed on a printing press used to print the document design elements, such as an offset or intaglio press. For the authentication of microscopic fingerprint images, a microscope, a high-resolution scanner, a camera with a macro lens, or a smart phone with an attached magnification device can be used.

For printing images that have been integrated with fingerprint images, various hardware devices may be utilized. Dye-sublimation, thermal re-transfer, ink-jet, toner laser, and laser engraving are non-limiting examples of printing technologies that can be utilized. Alternatively, embedded synthetic fingerprints may be a static feature, without variable data, and printed on a printing press used to print the document design elements, such as an offset or intaglio press. If real fingerprints are used, the biometric information inherent in real fingerprints, such an individual identity, may be verified or matched either by using a software system combined with a digital acquisition device, or by a human expert using a magnification device.

Example Methods for Embedding and Extracting Data from Biometric Identifiers

Figure 8A:
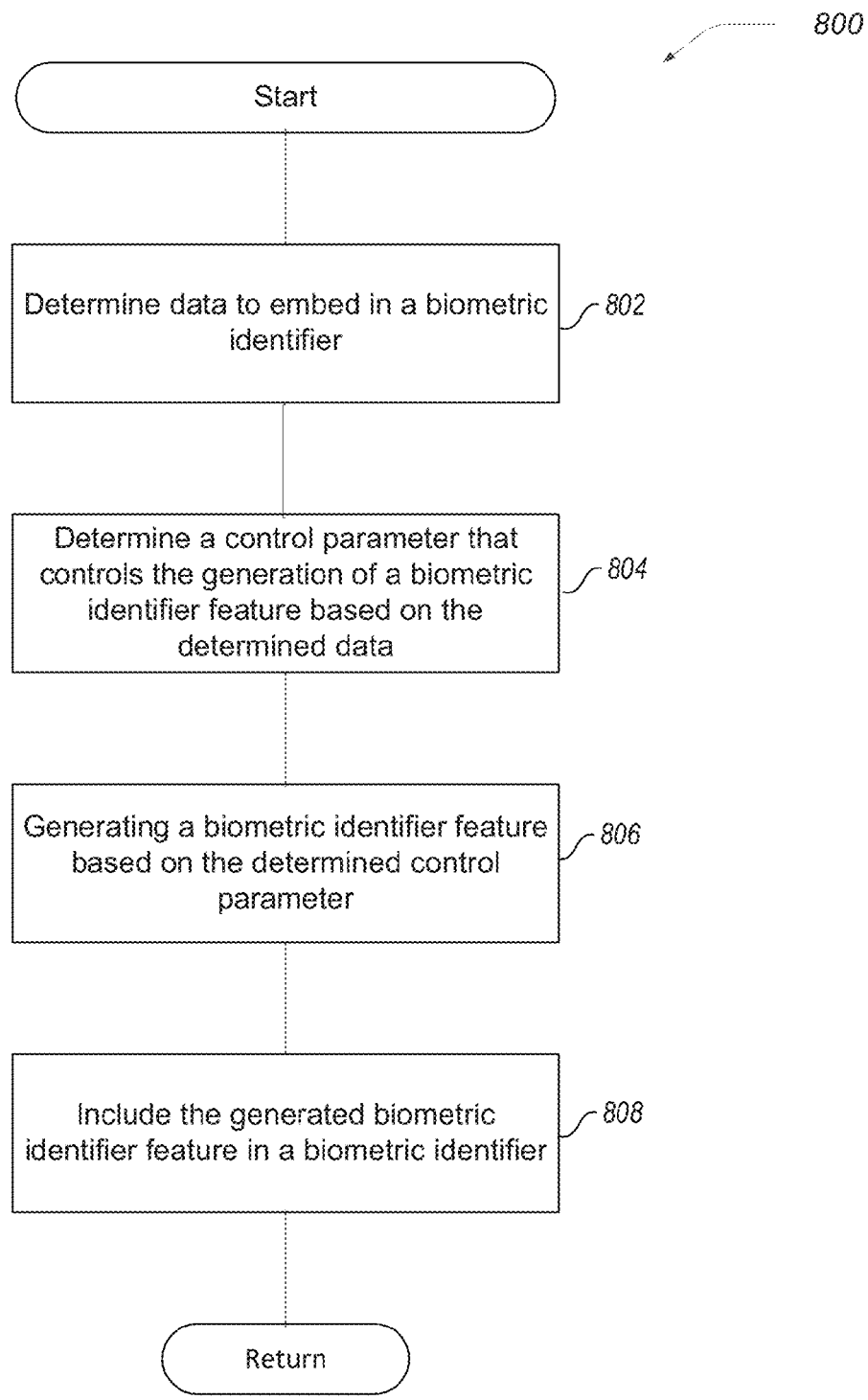
FIG. 8A provides a flow diagram illustrating operations performed by an example method for embedding data in a biometric identifier.

FIG. 8A provides a flow diagram illustrating operations performed by an example method 800 for embedding data into a biometric identifier, such as a real or synthetic fingerprint. Method 800 may be employed to tamper-proof a document. After a start block, method 800 progresses to block 802. At block 802, the data to embed in the biometric identifier is determined. In some embodiments, the data is determined based on a variable data stream. The variable data stream may be determined via scanning and/or OCR'ing the document to be tamper-proofed. The data may be determined directly from a storage device or an electronic/digital version of the document. In some embodiments, the determined data includes a hash or a summary of other data. The data may be encrypted data. In at least one embodiment, error codes are embedded in the data to increase the robustness of the data.

At block 804, at least one control parameter is determined. The determined control parameters control the generation of at least one biometric identifier feature based on the data determined at block 804. The biometric identifier features may be Level One, Level Two, or a Level Three feature, or a combination thereof.

In preferred embodiments, a plurality of control parameters are determined. Each control parameter controls the generation of one or more biometric identifier features. For instance, at least one control parameter is determined to control a Level One fingerprint feature (Level One control parameter). Furthermore, at least one other control parameter is determined to control a Level Two fingerprint feature (Level Two parameter). The Level One control parameters are based on a first portion of the determined data. The Level Two control parameters are based on a second portion of the determined data. Both the first and the second portions of the data are to be embedded in a biometric identifier.

Level One parameters may include any parameters that parameterize the shape, position, size, contour, or orientation of a fingerprint silhouette. Other Level One parameters may control a ridge/valley frequency map or field of periods. In various embodiments, Level One parameters include singularities or poles in a complex plane that define an orientation field. Level Two control parameters may parameterize the type, position, and angle of a plurality of fingerprint minutiae. Level Three parameters may control the type, position, and angle of finer fingerprint details, such as sweat pores, incipient ridges, small dots, and the like.

At block 806, at least one biometric identifier feature is generated. The biometric features are based on the control parameters determined at block 804. Generating a biometric feature may include updating, modifying, or otherwise adjusting a biometric feature that is included in a biometric identifier. Each of the generated, updated, or modified biometric features may be Level One, Level Two, or Level Three features, or any combination thereof features.

At block 808, the generated biometric identifier features are included in a biometric identifier. The biometric identifier may be generated based on the biometric identifier features. In other embodiments, the biometric identifier may be updated, modified, or otherwise adjusted based on the generated biometric identifier features. When the generated biometric identifier features are included in the biometric identifier, the biometric identifier is embedded with at least a portion of the data that was determined in block 802. The embedded data may be extracted or decoded via an analysis. One such analysis is shown in an embodiment of method 810, discussed in the context of FIG. 8A. In at least one embodiment, the generated biometric identifier is included in the document to be tamper-proofed.

Figure 8B:
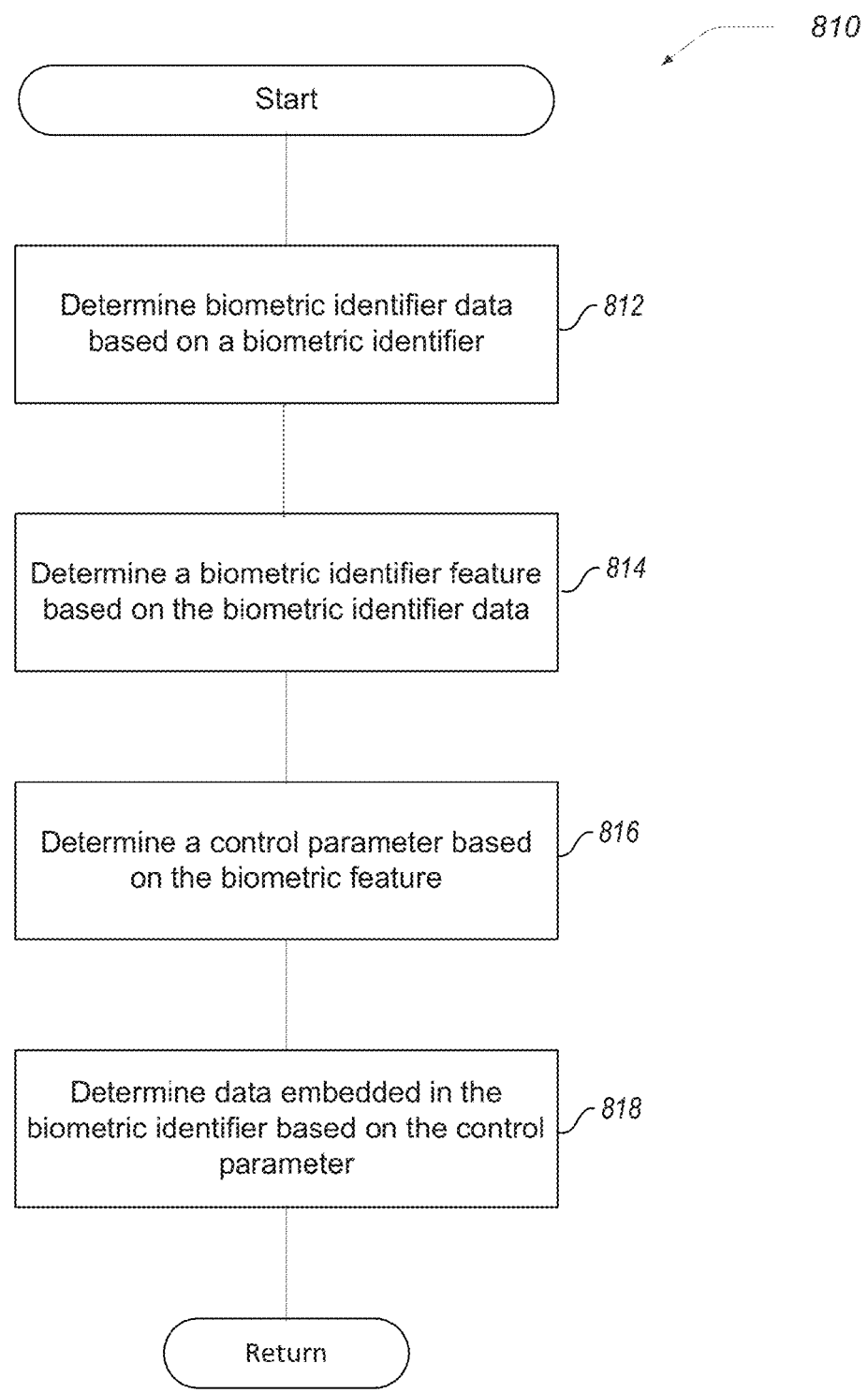
FIG. 8B provides a flow diagram illustrating operations performed by an example method extracting embedded data from a biometric identifier.

FIG. 8B provides a flow diagram illustrating operations performed by an example method 810 for extracting or decoding data embedded in a biometric identifier, such as a real or a synthetic fingerprint. The data may have been embedded by a process similar to method 800 of FIG. 8A. Method 800 may be employed to insure that a document has not been tampered with. After a start block, method 810 progresses to block 812. At block 812, biometric identifier data is determined based on a biometric identifier that includes embedded data. Determining the biometric identifier data may include scanning or otherwise acquiring image data of a biometric identifier image. In at least one embodiment, the biometric identifier data is determined directly from a digital version of the biometric identifier. The biometric identifier may have been included in the document that is to be checked for tampering.

At block 814, at least one biometric identifier feature is determined based on the biometric identifier data. The features may include any combination of Level One, Level Two, or Level Three features. In block 816, at least one control parameter is determined based on the biometric features determined at block 814. At block 818, the data that is embedded in the biometric identifier is determined based on the control parameters determined at block 816. Determining the data at block 818 may include extracting or decoding the data embedded in the biometric identifier.

The determined data may be compared to other data included in the document. Such a comparison may include performing an OCR operation on the document to determine other document data within data fields of the document. If the data embedded in the biometric identifier does not correspond to at least a portion of the other data in the document, the document may have been tampered with. Such a correspondence may include an equivalency of the document data or an equivalency of a hash of the document data.

Example Computing System Implementation

Figure 9:
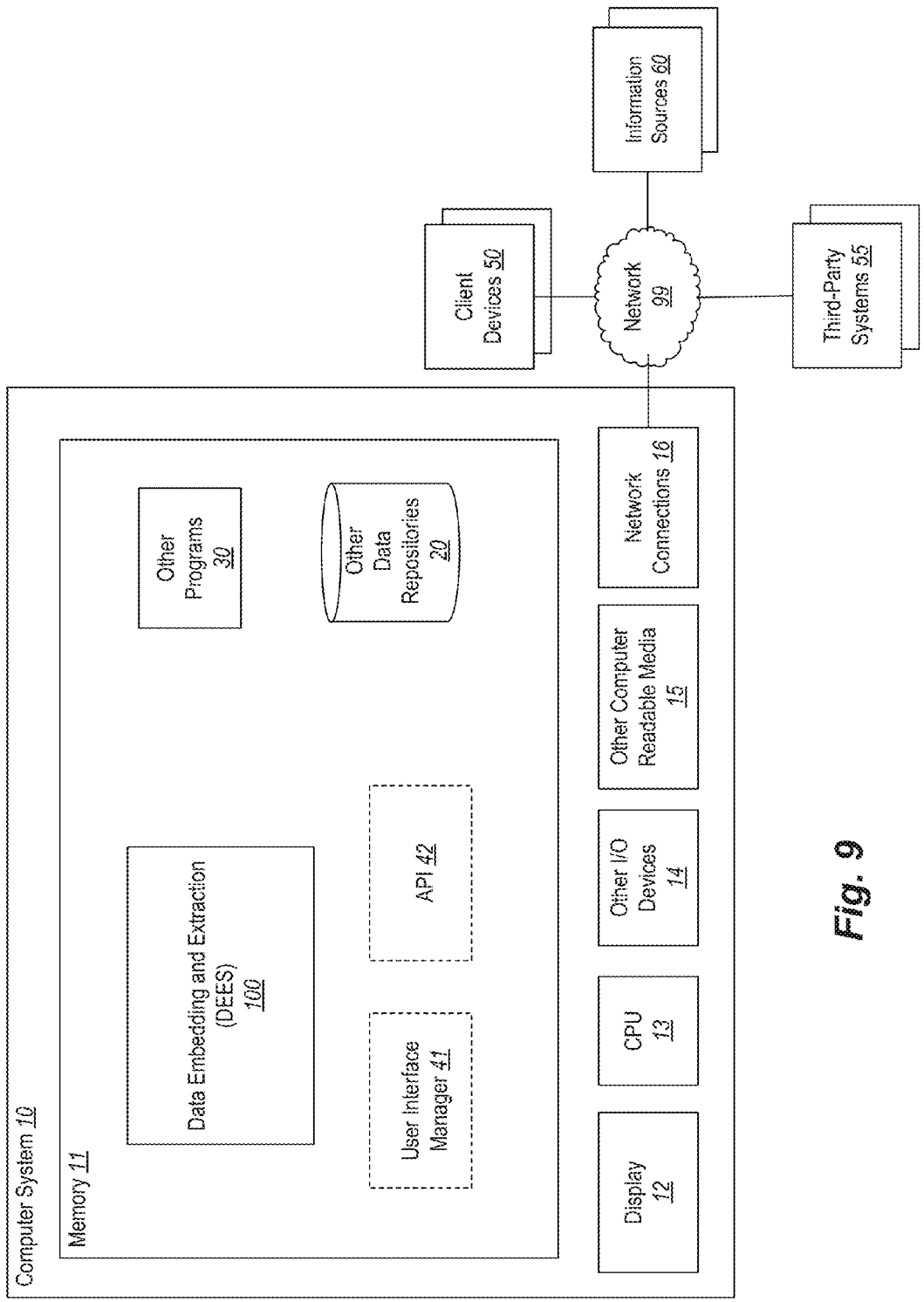
FIG. 9 is an example block diagram of an example computing system for implementing a Data Embedding and Extraction System (DEES) according to an example embodiment.

FIG. 9 is an example block diagram of an example computing system for implementing a Data Embedding and Extraction System (DEES) according to an example embodiment. In particular, FIG. 9 shows a computing system 10 that may be utilized to implement a DEES 100. In addition, at least some of the implementation techniques described herein with respect to the DEES 100 may be used to implement other devices, systems, or modules described herein. Any of the processes, methods, algorithms, and the like disclosed herein may be implemented in DEES 100. For instance, at least any of the processes described in the context of FIG. 1 through FIG. 7 may be enabled by at least DEES 100.

Note that one or more general purpose or special purpose computing systems/devices may be used to implement the DEES 100. In addition, the computing system 10 may comprise one or more distinct computing systems/devices and may span distributed locations. Furthermore, each block shown may represent one or more such blocks as appropriate to a specific embodiment or may be combined with other blocks. In addition, the DEES 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The DEES 100 is shown residing in memory 11. In other embodiments, some portion of the contents, some or all of the components of the DEES 100 may be stored on and/or transmitted over the other computer-readable media 15. The components of the DEES 100 preferably execute on one or more CPUs 13 and perform the techniques described herein. Other codes or programs 30 (e.g., an administrative interface, a Web server, and the like) and potentially other data repositories, such as data repository 20, also reside in the memory 11, and preferably execute on one or more CPUs 13. Of note, one or more of the components in FIG. 9 may not be present in any specific implementation. For example, some embodiments may not provide other computer readable media 15 or a display 12.

The DEES 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the DEES 100.

The UI manager 41 provides a view and a controller that facilitate user interaction with the DEES 100 and its various components. For example, the UI manager 41 may provide interactive access to the DEES 100, such that users can interact with the DEES 100. In some cases, users may configure the operation of the DEES 100, such as by providing the DEES 100 credentials to access various information sources, including social networking services, email systems, document stores, or the like. In some embodiments, access to the functionality of the UI manager 41 may be provided via a Web server, possibly executing as one of the other programs 30. In such embodiments, a user operating a Web browser executing on one of the client devices 50 can interact with the DEES 100 via the UI manager 41.

The API 42 provides programmatic access to one or more functions of the DEES 100. For example, the API 42 may provide a programmatic interface to one or more functions of the DEES 100 that may be invoked by one of the other programs 30 or some other module. In this manner, the API 42 facilitates the development of third-party software, such as user interfaces, plug-ins, adapters (e.g., for integrating functions of the DEES 100 into Web applications), and the like.

In addition, the API 42 may be in at least some embodiments invoked or otherwise accessed via remote entities, such as code executing on one of the client devices 50, information sources 60, and/or one of the third-party systems/applications 55, to access various functions of the DEES 100. For example, an information source 60 may push personal information and/or document information (e.g. a database including personal data and data related to the document issuance) to the DEES 100 via the API 42. The API 42 may also be configured to provide management widgets (e.g., code modules) that can be integrated into the third-party applications 55 and that are configured to interact with the DEES 100 to make at least some of the described functionality available within the context of other applications (e.g., mobile apps).

The DEES 100 interacts via the network 99 with client devices 50, information sources 60, and third-party systems/applications 55. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/ applications 55 may include any systems that provide data to, or utilize data from, the DEES 100, including Web browsers, e-commerce sites, calendar applications, email systems, social networking services, and the like.

In an example embodiment, components/modules of the DEES 100 are implemented using standard programming techniques. For example, the DEES 100 may be implemented as a "native" executable running on the CPU 13, along with one or more static or dynamic libraries. In other embodiments, the DEES 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported. In addition, other functions could be implemented and/or performed by each component/module, and in different orders, and by different components/modules, yet still achieve the described functions.

In addition, programming interfaces to the data stored as part of the DEES 100, such as in the data stores 116 and/or 20, can be available by standard mechanisms such as through C, C++, C#, and Java APIs; libraries for accessing files, databases, or other data repositories; through scripting languages such as XML; or through Web servers, FTP servers, or other types of servers providing access to stored data. The data stores 116 and/or 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the DEES 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), digital signal processors ("DSPs") and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for the automatic verification and quality assurance of travel documents are applicable to other architectures or in other settings. Also, the methods, techniques, and systems discussed herein are applicable to differing protocols, communication media (optical, wireless, cable, etc.) and devices (e.g., desktop computers, wireless handsets, smart phones, electronic organizers, personal digital assistants, tablet computers, portable email machines, game machines, pagers, navigation devices, etc.).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for constructing a fingerprint image having fingerprint features that represent personal data, image data, or document data for use in document security, the method comprising:
   generating a ridge map based on a blending of an orientation map with a frequency map;
   obtaining data to encode within the ridge map, wherein the encoded data includes variable or static data that represents the personal data, the image data, or the document data;

determining at least one control parameter associated with the ridge map, wherein the at least one control parameter corresponds to a characteristic of the ridge map;

adjusting the at least one control parameter to modify at least one of a phase of the ridge map, a frequency of the ridge map, a silhouette of the ridge map, a ridge thickness, a ridge brightness, and a position of at least one two-dimensional point that corresponds to a minutia of the ridge map to encode the obtained data within the ridge map;

generating at least one fingerprint feature from the adjusted at least one control parameter, wherein the at least one generated fingerprint feature is embedded within the ridge map to render a constructed fingerprint image having a modified ridge map that includes the obtained data encoded therein, wherein embedding the at least one generated fingerprint feature in the ridge map includes modulating the corresponding phase, frequency, silhouette, ridge thickness, ridge brightness, or position of the at least one two-dimensional point that corresponds to the minutia; and applying the constructed fingerprint image to a physical document.

2. The method of claim 1, wherein the at least one control parameter modifies at least one of an angle, a translation, or a shape descriptor of the silhouette of the ridge map.

3. The method of claim 1, wherein the at least one control parameter modifies a position of a plurality of two-dimensional points, wherein each of the plurality of two-dimensional points corresponds to a vertex of a polygon that approximates the silhouette of the ridge map.

4. The method of claim 1, wherein the at least one control parameter modifies the frequency in a frequency map associated with the ridge map.

5. The method of claim 1, wherein the at least one control parameter modifies a position of a two-dimensional point, wherein the two-dimensional point corresponds to a singularity in the orientation map associated with the ridge map.

6. The method of claim 1, wherein providing the minutia in the ridge map includes filtering the minutia based on a morphological filter matched to the minutia.

7. The method of claim 1 further comprising:
determining an orientation map segment based on the minutia; and
generating the ridge map based on the determined orientation map segment.

8. The method of claim 1, wherein determining the at least one control parameter includes:
determining a position for each of a plurality of two-dimensional points, wherein each of the plurality of two-dimensional points corresponds to a pore; and
determining a pore type for each of the plurality of two-dimensional points.

9. The method of claim 1, further comprising:
generating a mask based on at least one image of the ridge map; and
masking at least one frame of image data with the generated mask.

10. The method of claim 1, further comprising generating a halftone image based on an image of the constructed fingerprint image and other image data.

11. The method of claim 1, wherein the constructed fingerprint image is a microscopic identifier such that the included fingerprint feature is not resolvable by an unaided human eye.

12. A non-transitory computer-readable medium including contents that, when executed by a computing device, facilitate constructing a fingerprint image having fingerprint features that represent personal data, image data, or document data for use in document security, by performing a method comprising:

generating a ridge map based on a blending of an orientation map with a frequency map;

obtaining data to encode within the ridge map, wherein the encoded data includes variable or static data that represents the personal data, the image data, or the document data;

determining at least one control parameter associated with the ridge map, wherein the at least one control parameter corresponds to a characteristic of the ridge map;

adjusting the at least one control parameter to modify at least one of a phase of the ridge map, a frequency of the ridge map, a silhouette of the ridge map, a ridge thickness, a ridge brightness, and a position of at least one two-dimensional point that corresponds to a minutia of the ridge map to encode the obtained data within the ridge map;

generating at least one fingerprint feature from the adjusted the at least one control parameter, wherein the at least one generated fingerprint feature is embedded within the ridge map to render a constructed fingerprint image having a modified ridge map that includes the obtained data encoded therein, wherein embedding the at least one generated fingerprint feature in the ridge map includes modulating the corresponding phase, frequency, silhouette, ridge thickness, ridge brightness, or position of the at least one two-dimensional point that corresponds to the minutia; and applying the constructed fingerprint image to a physical document.

13. The computer-readable medium of claim 12, wherein determining at least one control parameter includes determining a first control parameter that corresponds to a first portion of the at least one of variable or static data and determining a second control parameter that corresponds to a second portion of the at least one of variable or static data such that both the first portion and the second portion of the data are embedded in the ridge map.

14. The computer-readable medium of claim 13, wherein:
adjusting the at least one control parameter to generate the at least one fingerprint feature includes generating a Level One fingerprint feature based on the first control parameter and generating a Level Two fingerprint feature based on the second control parameter and
wherein embedding the at least one generated fingerprint feature within the ridge map includes embedding the Level One fingerprint feature in within the ridge map and embedding the Level Two fingerprint feature within the ridge map.

15. A computing system configured to facilitate constructing a fingerprint image having fingerprint features that represent personal data, image data, or document data for use in document security, comprising:
a processor device;
a memory device;
a module that is stored by the memory device and that is configured, when executed by the processor device, to:
generate a ridge map based on a blending of an orientation map with a frequency map;
obtain data to encode within the ridge map, wherein the encoded data includes variable or static data that represents the personal data, the image data, or the document data;

determine at least one control parameter associated with the ridge map, wherein the at least one control parameter corresponds to a characteristic of the ridge map;

adjust the at least one control parameter to modify at least one of a phase of the ridge map, a frequency of the ridge map, a silhouette of the ridge map, a ridge thickness, a ridge brightness, and a position of at least one two-dimensional point that corresponds to a minutia of the ridge map to encode the obtained data within the ridge map;

generate at least one fingerprint feature from the adjusted at least one control parameter, wherein the at least one generated fingerprint feature is embedded within the ridge map to render a constructed fingerprint image having a modified ridge map that includes the obtained data encoded therein, wherein embedding the at least one generated fingerprint feature in the ridge map includes modulating the corresponding phase, frequency, silhouette, ridge thickness, ridge brightness, or position of the at least one two-dimensional point that corresponds to the minutia; and apply the constructed fingerprint image to a physical document.

16. The computing system of claim 15, wherein the constructed fingerprint image is a microscopic identifier such that the included fingerprint feature is not resolvable by an unaided human eye.

17. The computing system of claim 15, the module further configured to integrate the constructed fingerprint image with image data such that the constructed fingerprint image and the image data are separately resolvable when integrated.

18. The method of claim 1, wherein at least a portion of the constructed fingerprint image includes a real fingerprint.

19. The method of claim 1, wherein the constructed fingerprint image includes a plurality of artificial fingerprint images that are combined to form the constructed fingerprint image.

20. The method of claim 6, further comprising providing the at least one fingerprint feature in the ridge map by smoothing the filtered minutia.

21. The method of claim 1, wherein determining the at least one control parameter includes:
   determining a position for each of a plurality of two-dimensional points, wherein each of the plurality of two-dimensional points corresponds to a minutia; and
   determining a minutia type for each of the plurality of two-dimensional points.

22. The method of claim 1, further comprising:
   integrating the ridge map with the image data either as a mask or as a halftone screen,
   wherein the mask darkens pixels corresponding to the ridges and brightens pixels corresponding to the valleys, and
   wherein the halftone screen produces thicker ridges in dark portions of the image and thinner ridges in light portions of the image.

23. The method of claim 22, wherein the image data comprises at least one of a photograph or a logo.

24. The method of claim 1, wherein the ridge map is obtained from a real fingerprint image.

25. The method of claim 24, wherein the ridge map comprises minutiae data extracted from the real fingerprint image, including at least one of the location, type, and orientation of the minutiae in the real fingerprint image.

* * * * *